United States Patent
Pittman (10) Patent No.: US 9,551,581 B2
(45) Date of Patent: Jan. 24, 2017

(54) TURN-BY-TURN NAVIGATION SYSTEM AND METHOD USING FEEDFORWARD LOCATION ESTIMATION

(71) Applicant: Adrian D. Pittman, Detroit, MI (US)

(72) Inventor: Adrian D. Pittman, Detroit, MI (US)

(73) Assignee: Albright Holdings, Inc., Grand Haven, MI (US)

( * ) Notice: Subject to any disclaimer, the term of this patent is extended or adjusted under 35 U.S.C. 154(b) by 9 days.

(21) Appl. No.: 14/587,875

(22) Filed: Dec. 31, 2014

(65) Prior Publication Data

US 2015/0185023 A1    Jul. 2, 2015

Related U.S. Application Data

(60) Provisional application No. 61/922,229, filed on Dec. 31, 2013.

(51) Int. Cl.
  *G01C 21/20* (2006.01)
(52) U.S. Cl.
  CPC .................................. *G01C 21/206* (2013.01)
(58) Field of Classification Search
  CPC .................................................... G01C 21/206
  See application file for complete search history.

(56) References Cited

U.S. PATENT DOCUMENTS

| | | |
|---|---|---|
| 6,473,038 B2 | 10/2002 | Patwari et al. |
| 6,728,636 B2 | 4/2004 | Kokojimi et al. |
| 6,900,762 B2 | 5/2005 | Andrews et al. |
| 7,035,650 B1 | 4/2006 | Moskowitz et al. |
| 7,199,754 B2 | 4/2007 | Krumm et al. |
| 7,209,751 B2 | 4/2007 | Nishida et al. |
| 7,250,907 B2 | 7/2007 | Krumm et al. |
| 7,263,375 B2 | 8/2007 | Zavada et al. |
| 7,272,404 B2 | 9/2007 | Overy et al. |
| 7,339,523 B2 | 3/2008 | Bye |
| 7,426,197 B2 | 9/2008 | Schotten et al. |
| 7,496,445 B2 | 2/2009 | Mohsini et al. |
| 7,590,720 B2 | 9/2009 | Bahl |
| 7,603,128 B1 | 10/2009 | Jones et al. |
| 8,014,797 B2 | 9/2011 | Walsh et al. |
| 8,040,219 B2 | 10/2011 | Haartsen et al. |
| 8,077,090 B1 | 12/2011 | Chintalapudi et al. |
| 8,185,133 B2 | 5/2012 | Billmaier et al. |
| 8,188,921 B2 | 5/2012 | Marks et al. |
| 8,290,511 B2 | 10/2012 | Burdo et al. |

(Continued)

*Primary Examiner* — Rodney Butler
*Assistant Examiner* — Frederick Brushaber
(74) *Attorney, Agent, or Firm* — Frank M. Scutch, III (57) ABSTRACT

A turn-by-turn internal navigation system for use with a mobile electronic device includes three receives for using a trilateration navigational algorithm using first receiver for receiving a cellular tower radio frequency (RF) signal, a second receiver for receiving a WiFi RF signal; and a third receiver for receiving at least one Bluetooth RF signal based upon a BLE tag network. A processor works to execute an algorithm using feed-forward estimation such that no feedback is needed for distance error correction. The algorithm uses dead reckoning navigation in combination with information from the first receiver, second receiver and third receiver to generate positional information such that in-building navigation instructions are displayed on the mobile electronic device.

9 Claims, 7 Drawing Sheets

(56) References Cited

U.S. PATENT DOCUMENTS

| | | |
|---|---|---|
| 8,294,617 B2 | 10/2012 | Rieger, III |
| 8,350,758 B1 | 1/2013 | Parvizi et al. |
| 8,400,292 B2 * | 3/2013 | Kummetz ............. G01S 5/0289 340/517 |
| 8,412,232 B2 | 4/2013 | Gupta et al. |
| 8,498,807 B2 | 7/2013 | Moore et al. |
| 8,504,288 B2 | 8/2013 | Kadous et al. |
| 8,548,497 B2 | 10/2013 | Lymberopoulos et al. |
| 2012/0095678 A1 * | 4/2012 | Moore .................... G01S 19/48 701/434 |
| 2013/0082974 A1 * | 4/2013 | Kerr .................... G06F 21/6245 345/174 |
| 2013/0222369 A1 * | 8/2013 | Huston .................. G06T 17/00 345/419 |
| 2014/0278054 A1 * | 9/2014 | Tidd ....................... G01C 21/00 701/409 |
| 2015/0018011 A1 * | 1/2015 | Mendelson .......... G01C 21/206 455/456.3 |

\* cited by examiner

User's position marker is always center of map. Map automatically reorients -- forward is always up.

FIG. 14B

USER NAVIGATION: CORE SCREEN & SWIPE FUNCTIONALITY

The MAP screen is the core screen. From here you can swipe as follows to navigate to other screens:

FIG. 14A

TURN-BY-TURN NAVIGATION SYSTEM AND METHOD USING FEEDFORWARD LOCATION ESTIMATION

CROSS REFERENCE TO RELATED APPLICATIONS

This application claims priority under 35 U.S.C. §119(e) to Provisional Patent application Ser. No. 61/922,229 filed on Dec. 31, 2013.

FIELD OF THE INVENTION

The present invention relates generally to internal building navigation and more particularly to a system and method of providing turn-by-turn navigation within a building using feed forward estimation techniques.

BACKGROUND

Prior art methods for internal navigation include those that receive one signal, such as GPS or Wi-Fi to provide navigation in an internal map stored at the mobile device. Further, other types of internal, in-building navigation provide directions to a portable communications device that are provided by a server, from a fixed wireless communication device, information identifying a current location of a portable communication device. These methods further include identifying a direction of movement to be communicated to the portable communication device which direct it towards a destination within the building. The method also includes transmitting the direction of movement to the portable communication device from the server via a fixed wireless communication device. Those skilled in the art will recognize that this type of system uses a local centralized server which can be cost prohibitive.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a turn-by-turn navigational system using feed forward estimation. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a turn-by-turn navigational system using feed forward estimation described herein. The non-processor circuits may include, but are not limited to, a radio receiver, a radio transmitter, signal drivers, clock circuits, power source circuits, and user input devices. As such, these functions may be interpreted as steps of a method to perform a turn-by-turn navigation using feed-forward location estimation. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 1A:
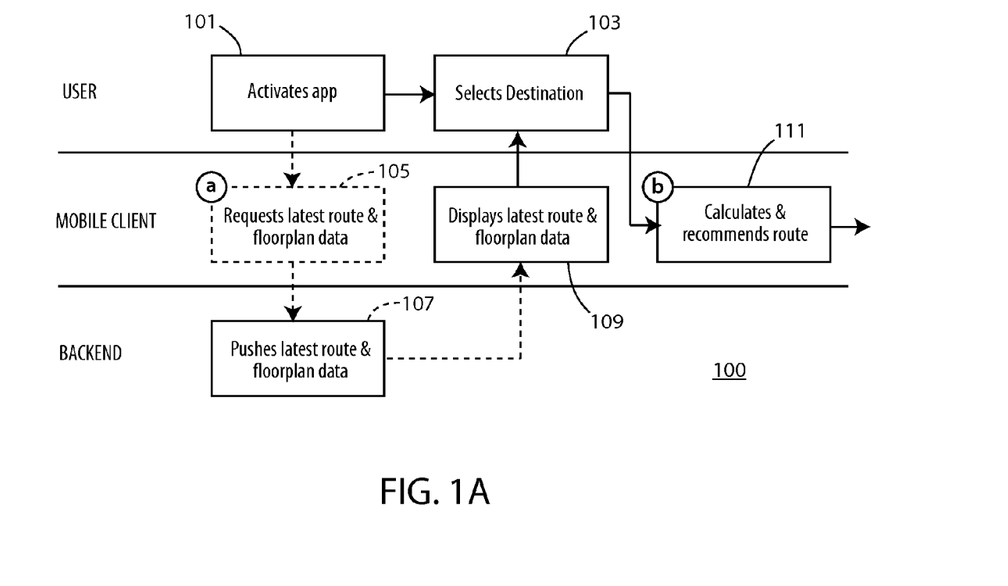
FIGS. 1A and 1B are figures illustrating a flow chart used in accordance with an embodiment of the invention.
Figure 1B:
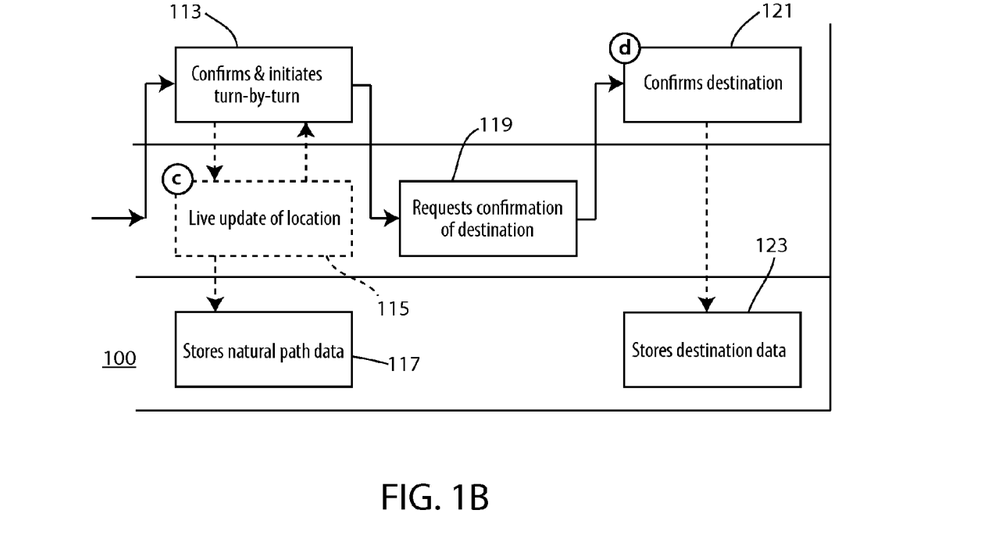

FIGS. 1A and 1B is a flowchart diagram illustrating the navigational process used in accordance with an embodiment of the invention. FIGS. 1A and 1B connect to form one chart. The standard navigation process 100 begins were the user activates the application (app) 101 and selects a destination 103. The mobile client running the app requests the latest route and floor plan data 105 from the server which is typically connected to the Internet. The mobile client can also retrieve the latest route and floor plan data 107 through a backend portal such as a remote server or Cloud. The information is then displayed as the latest route and floor plan data 109. This information is also provided to the user in the selection of destination 103. As will be described herein, each user has a unique app identification (ID) and access level that is passed to the network. User access data may be stored locally at the network or in Cloud based memory using the Internet. The stored data dictates which floor plans and location tags are shared with the user via their mobile client. Those skilled in the art will recognize that access levels for controlling access to various building locations are administratively controlled. The various access levels (e.g. public, private, administrative) would be provided based upon need.

After the destination is selected 103, the mobile client then calculates and recommends a route 111. Those skilled in the art will recognize that if multiple route options are available, these will be displayed in a manner such that the user can select which route option is preferred. After the route is calculated and recommended to the user 111, the user can confirm and initiate a specific turn-by-turn navigational route 113. The mobile client will provide a live update of location 115 which can then be stored as natural path data 117. In the event of a lost user, e.g. if the user's natural travel pattern becomes erratic (as determined by the positioning algorithm), such as crossing back over their path multiple times or walking in circles, the mobile client will offer an on-screen prompt asking the user if they require assistance. If the user confirms in the positive, an administrator is alerted.

After the user confirms and initiates the turn-by-turn navigation 113, the mobile client requests confirmation of the destination 119 which is confirmed by the user 121. The confirmation sequence includes an acknowledgement that the selected and/or desired destination was received and that the name or title of the destination is accurate. The user is then notified of the response. The sequence is most common during a learning process and/or phase of the system implementation and will become less frequent over time.

Figure 2:
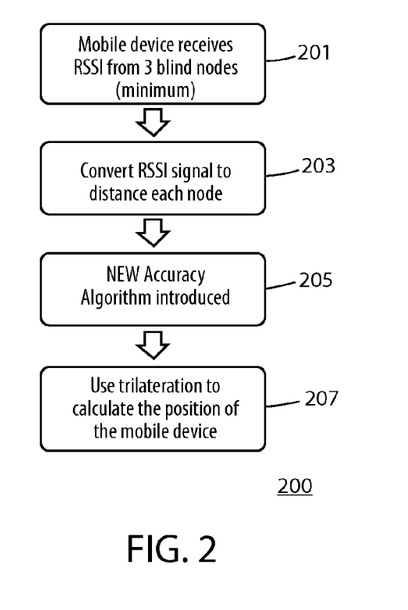
FIG. 2 is a flow chart diagram showing use of an algorithm in accordance with an embodiment of the invention.

FIG. 2 is a flowchart diagram showing use of an the turn-by-turn navigational algorithm in accordance with an embodiment of the invention. In determining position for internal navigation, the mobile device initially receives a radio signal strength indication (RSSI) from at least three (3) blind nodes 201.

The RSSI Distance Relationship is determined by Eq. (1).

$$\text{RSSI} = (10 * n * \log 10(\text{Distance}) - A) \quad \text{(Eq. 1)}$$

where:
A—is the RSSI for a given beacon at 1 meter
n—is the RF signal effectiveness The use of three nodes are designated a "trilateration" location process. In geometry, trilateration is the process of determining absolute or relative locations of points by measurement of distances, using the geometry of circles, spheres or triangles. The RSSI signal strength indications are converted to a numerical distance value from each node. In other words, the amplitude of each signal strength indication is used to determine an exact in-building geographic position from the receiving node 203. This position will typically be within 1 meter or less accuracy. As will be described herein, an accuracy algorithm 205 is then used to determine distance 205 where a "trilateration" process works to calculate the position of the mobile device 207. Three (3) points are determined in X-Y coordinates to calculate the position of a 4th object (mobile device) as shown in Eq. (2) below.

$$(x-xn)2+(y-yn)2=rn2 \quad \text{(Eq. 2)}$$

Thus: A–B=B–C $$x=\tfrac{1}{2}*(-a\hat{\ }2*f+a\hat{\ }2*d+g\hat{\ }2*f-e\hat{\ }2*d+f\hat{\ }2*b-b\hat{\ }2*f+ \\ b\hat{\ }2*d-d\hat{\ }2*b+c\hat{\ }2*f-g\hat{\ }2*d+d\hat{\ }2*f+h\hat{\ }2*bh\hat{\ }2*f- \\ f\hat{\ }2*d+d*z\hat{\ }2-c\hat{\ }2*b-b*z\hat{\ }2+e\hat{\ }2*b)/(-d*e-b*c- \\ a*f+c*f+b*e+a*d)$$

$$y=-\tfrac{1}{2}*(g\hat{\ }2*e-h\hat{\ }2*e-a*d\hat{\ }2+a*e\hat{\ }2+a*f\hat{\ }2-c*e\hat{\ }2+ \\ e*d\hat{\ }2+a\hat{\ }2*c-a\hat{\ }2*e+b\hat{\ }2*c-b\hat{\ }2*e+c\hat{\ }2*eg\hat{\ }2*c- \\ z\hat{\ }2*a+z\hat{\ }2*c-c*f\hat{\ }2-c\hat{\ }2*a+a*h\hat{\ }2)/(-d*e-b*c- \\ a*f+c*f+b*e+a*d)$$

where:
A: (a,b) B: (c,d) C: (e,f)
R1=g R2=h R3=z

Thus, the distance or the R1, R2, or the R3 are determined from the RSSI distance relationship using Equation (1).

Figure 3:
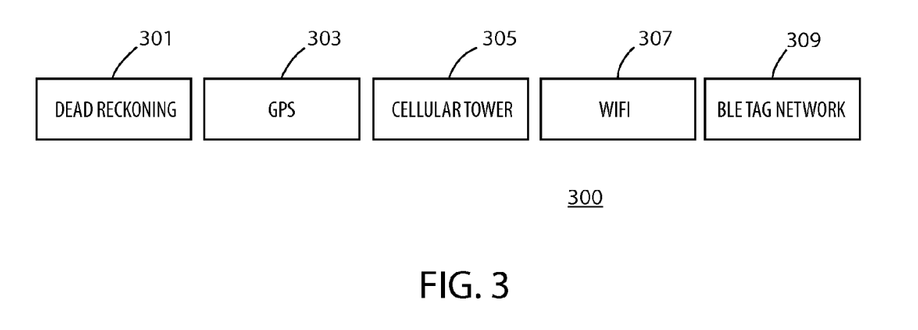
FIG. 3. is a block diagram illustrating deed reckoning and radio frequency (RF) used to calculate position in accordance with an embodiment of the invention.

FIG. 3 is a block diagram illustrating the use of dead reckoning and radio frequency (RF) sources to calculate position as used in the internal navigation process in accordance with an embodiment of the invention. In order that the mobile device calculate an accurate position, the RSSI from various RF sources are used to determine location. In addition to dead reckoning 301, a global positioning system (GPS) 303, a cellular telephone RF signal 305, a Wi-Fi (IEEE 802.11 standard) signal 307, and/or a Bluetooth Low Energy (BLE) tag network 309 may be used. The BLE tag network is defined by a plurality of low power RF tags spaced at predetermined locations throughout a building or floor of a building for providing a known source and location of RF Bluetooth energy. This Bluetooth RF source can be programmed to identify its physical location though use of an encoded address. This information is received by the Bluetooth receiver in the portable electronic device and is then input to an algorithm stored in firmware of the receiver of the mobile device 311. Thus, the output of this algorithm is used by the accuracy algorithm 205 as noted in FIG. 2.

Figure 4:
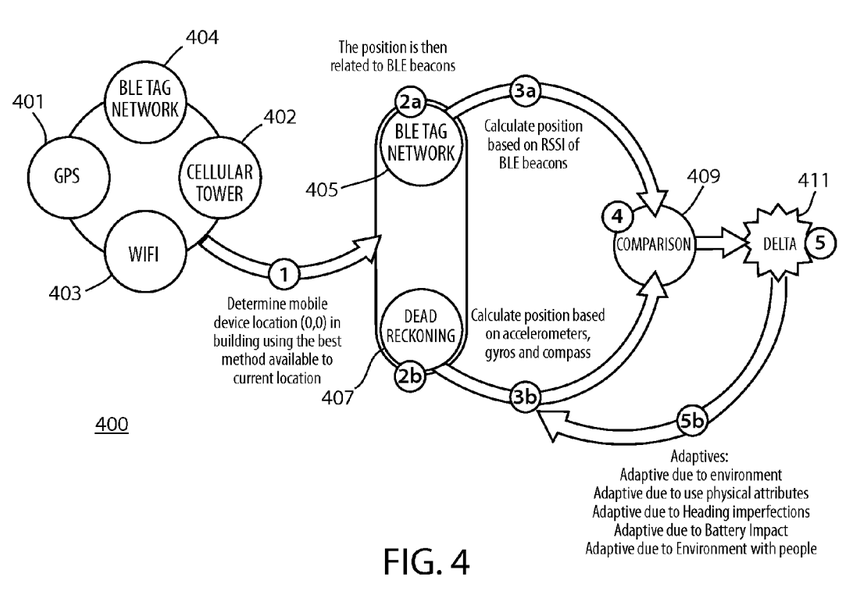
FIG. 4 is a flow chart diagram illustrating how the various sources are used to determine turn-by-turn navigational guidance.

FIG. 4 is a flowchart diagram illustrating how the various RF sources are used to determine turn-by-turn navigational guidance. The GPS source 401, the cellular source 402, the Wi-Fi source 403, in the BLE tag network source 404 are each used to determine the mobile device's in-building location using the best method and RF sources available based upon its current location. Once the user and mobile device are in motion, this position is then further corrected and/or determined based on the BLE beacons 405 as well as through the use of a dead reckoning process 407. Those skilled in the art will recognize that the term "dead reckoning" refers to the process of calculating one's position, in building, by estimating the direction and distance traveled from an initial starting point rather than by using landmarks, visual observations and/or RF electronic navigation signals. When using a mobile device, such as a cellular telephone, tablet or other device, dead reckoning is used in combination with the accelerometers, gyros and compass within the mobile device for calculating an accurate in-building position.

In use, the information from a BLE tag network 405 is used in combination with dead reckoning information 407 to make a comparison 409. The result of this comparison or "delta" 411 is then used to provide feedback that is an adaptive variable for providing a more accurate position. This process continues until the delta is a predetermined size indicating that the user is accurately within a predetermined distance of a point in-building. Those skilled in the art will recognize that the adaptive variables may include but are not limited to an adaptive due to physical environment, and adaptive due to user physical attributes, and adaptive due to heading imperfections, and adaptive due to battery impact, and an adaptive due to environmental interaction with other people.

Figure 5:
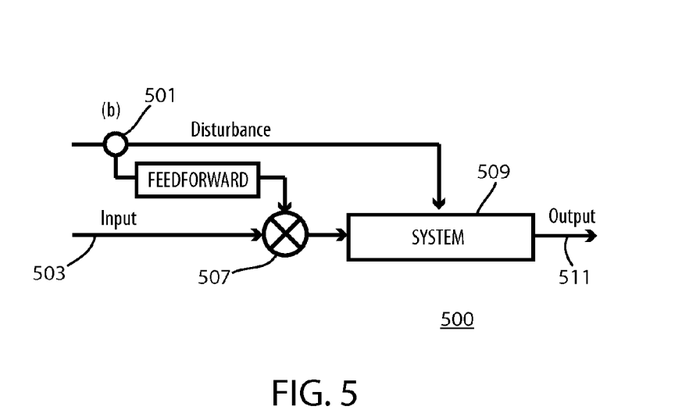
FIG. 5 is a block diagram illustrating the operation of a feed-forward error correction system.

FIG. 5 is a block diagram illustrating the operation of a feed-forward error correction system. Those skilled in the art will recognize that feed-forward error correction (FEC) or channel coding is a technique used for controlling errors in data transmission over unreliable or noisy communications channels. The central idea is that the sender codes their message in a redundant way by using an error correction code (ECC). This redundancy allows the receiver to detect a limited number of errors that may occur anywhere in the message, and often to correct those errors without retransmission. In accordance with this invention, the FEC gives the mobile device the ability to quickly correct location errors without needing a reverse channel, such as negative feedback, that would require a recalculation of distance data or current location information.

The feed-forward error corrections system 500 includes a first input 501 and second input 503. The first input 501 is applied to a feed-forward algorithm 505 as well as the navigational system 509. The output of the feed-forward algorithm 505 is supplied to mixer 507 where it is combined with the second input 503. The output of the mixer is also supplied to the navigational system 509. The output of the navigational system 511 is then used by the accuracy algorithm as described with regard to FIG. 2 and use with a trilateral ration process to calculate the position of the mobile device. Thus, FIG. 5 illustrates how a reading is calculation of a current "disturbance" or coefficient modifier then estimating the next position of the user. If the result is not within a predetermined calibration of the distance then a dead recognizing algorithm is selectively adapted in an appropriate adaptive cell. Thus, an environmental structural coefficient is not adapted if a person is moving but instead structural interference is adapted when the mobile device is not moving.

The coefficient modifier RSSI distance relationship is based on Eq. (3) below:

$$\text{Distance} = \exp(\frac{1}{10} \ast \log(10) \ast (RSSI+A)/(n \ast (C1+C2+C3)))$$ (Eq. 3)

where:
A—is the RSSI for a given beacon at 1 meter
n—is the signals effectiveness
C1, C2, C3—are coefficients from adaptive data (also known as "adaptives") which are determined using the "next best" distance estimation when current calculations are imprecise to do interference or other anomalies preventing an accurate distance estimation.

Figure 6:
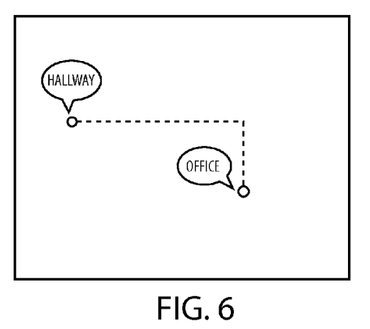
FIG. 6 is an illustration showing administrative set-up of the system according to an embodiment of the invention.
Figure 7:
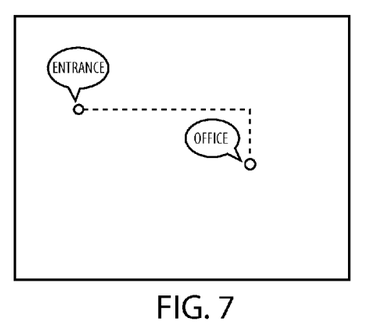
FIG. 7 is an illustration showing a first example of user input of the turn-by-turn navigation system according to an embodiment of the invention.

FIGS. 6 to 11 illustrate how the turn-by-turn user navigation system navigates an in-building void according to various embodiments of the invention. More specifically, FIG. 6 is an illustration showing an administrative setup of the system where an administrator sets up the network by tagging a key location on the route. In use, the system records the natural walking route in memory for future navigational use. FIG. 7 is an illustration showing a first example of user input of the turn by turn navigation system according to an embodiment of the invention. In this first example, as more people use the system, it will record their natural walking routes for future navigational use. In this example, the user is given navigational instructions and is asked by the system to confirm their start and stop position (as originally defined by the administrator). Here, they recommend that the hallway a location is more accurately referenced as "entrance". The system alerts the administrator to review the recommendation.

Figure 8:
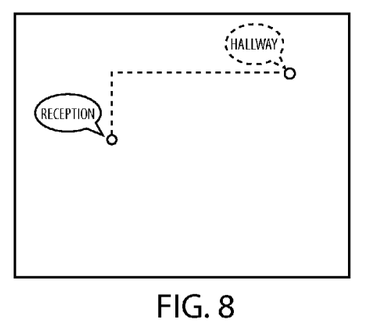
FIG. 8 is an illustration showing a second example of user input of the turn-by-turn navigation system according to an embodiment of the invention.

FIG. 8 is an illustration showing a second example the turn-by-turn navigation system. In this second example, the user walks to a new and previously undefined location and recommends a new destination (in this example called "reception"). The user is again alerted by the system, to review the recommendation and opts to designate the origination point has "hallway".

Figure 9:
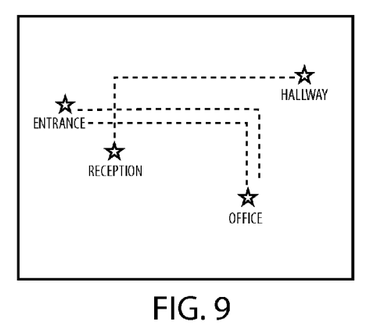
FIG. 9 is an illustration showing administered system intelligence.

FIG. 9 is an illustration showing administered system intelligence. In this illustration, all roots and destination points are reviewed and recorded in the system to improve the navigational options available to users on their mobile devices. This allows navigation without the provision of a scaled floor plan.

Figure 10:
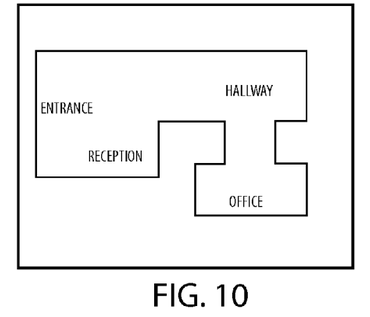
FIG. 10 is an illustration showing automated system intelligence.

FIG. 10 is an illustration showing automated system intelligence. In this illustration, the system monitors the range of natural walking movements of users and blocks out navigable zones which can be represented graphically on the app. In use, the user can edit this automatically generated field for greater accuracy. This allows users to view a visual approximation of the floor plan without the provision of a scale drawing.

Figure 11:
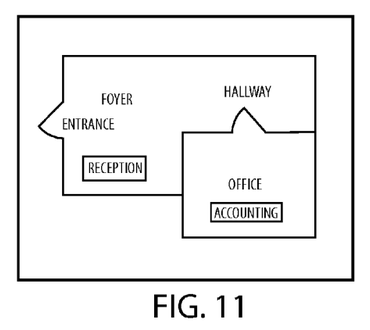
FIG. 11 is an illustration showing an administered scaled floor plan.

Finally, FIG. 11 is an illustration showing an administered scaled floor plan. In this illustration, the user can overlay a scaled drawing at any time to confirm the floor plan. This will supersede the dynamic floor plan that is automatically generated even though the system will continue to monitor and record natural patterns and location refinements. As demonstrated, the user can define additional destinations within the space.

Figure 12A:
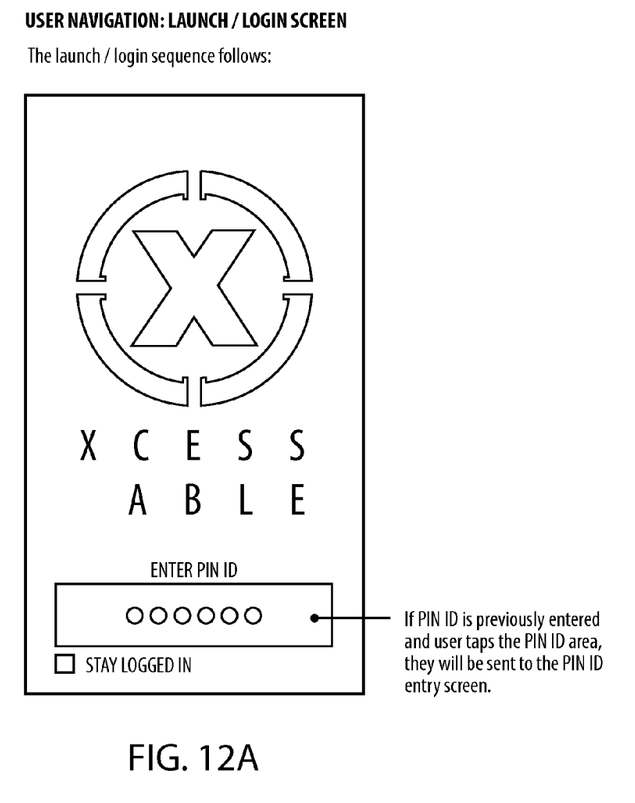
FIGS. 12A and 12B are screen shots illustrating launching a log-in screen according to an embodiment of the invention.
Figure 12B:
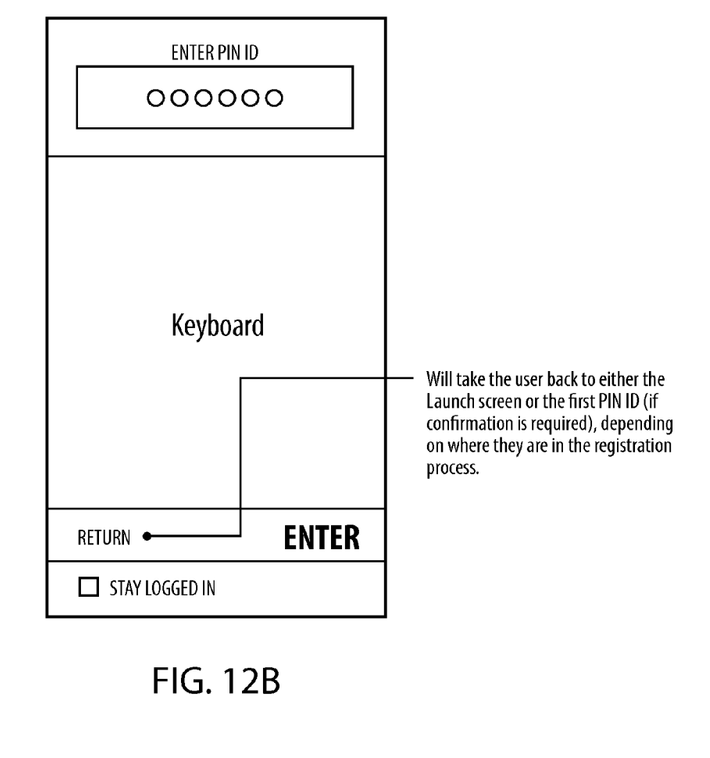

FIG. 12A and FIG. 12B are screenshots illustrating the launch of a login screen according to an embodiment of the invention. The login screen 1200 allows for a user to enter their pin ID to provide access. If the pin ID has been previously entered, the user can tap the pin ID area which will be sent to the pin ID entry screen. If the pin was previously entered and the stay logon option was selected, then the pin ID field is auto filled and the user progresses immediately from the line screen to the main screen. As seen in FIG. 12B, if the user is using the login screen, the "return" field will take the user back to either the line screen or the first pin ID if confirmation is required. This will depend on where the user's point in the registration process. If the app has not been previously entered or the user is registering the app for the first time, then they are prompted to create an alphanumeric ID where the app may request this information twice for confirmation before proceeding to the main screen.

Figure 13A:
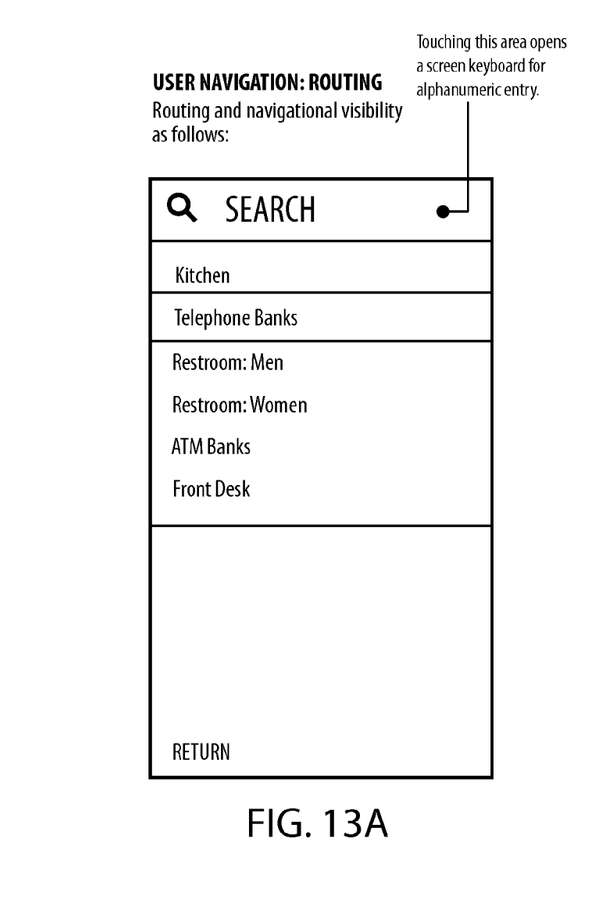
FIGS. 13A, 13B and 13C are screen shots showing user navigation routing according to an embodiment of the invention.
Figure 13B:
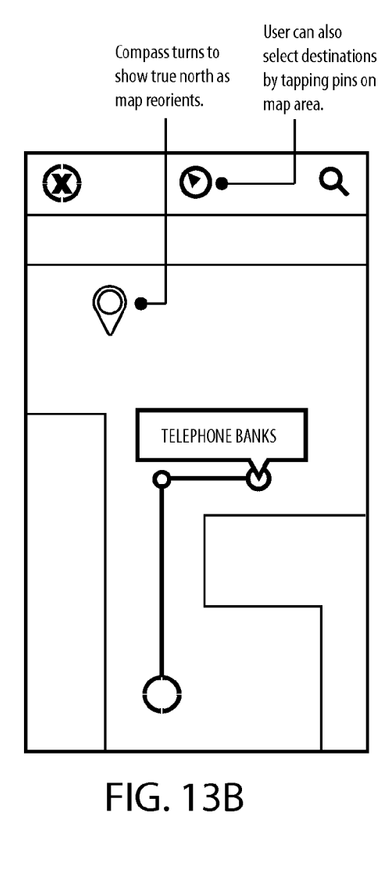
Figure 13C:
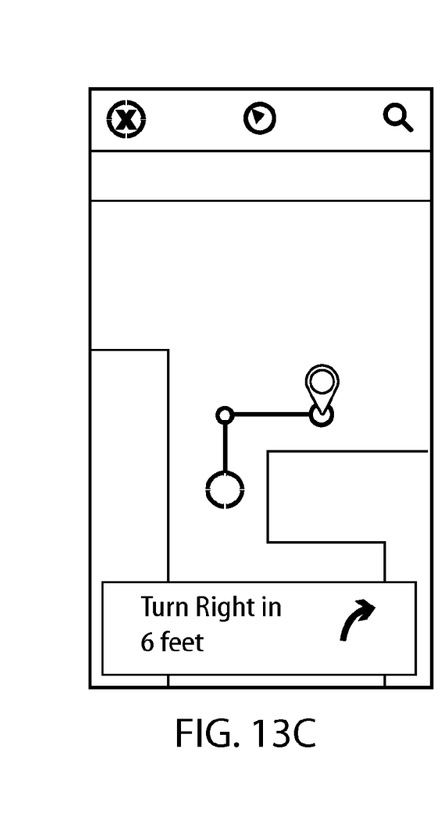

FIGS. 13A, 13B and 13C are screenshots showing user navigation routing according to an embodiment of the invention. FIG. 13 is a search screen where the user may select between kitchen, telephone bank, men's restroom, women's restroom, bank, and front desk. In the illustration, a telephone bank is selected. In cases where the selection is not visible, the search area of the screen can be selected. By touching the area, this launches a screen keyboard on the display for an alphanumeric entry. Thus, the user can enter a search term to filter the list of available destinations and or select a destination from the on-screen list by tapping it. FIG. 13B, illustrates a map displaying the location of the telephone bank. In the illustration, a compass located at the center of the upper display, turns to show true north as the map reorients itself. The user can also select destinations by tapping pans on the map area. The user can to see its title. Double tapping will prompt the system to ask if the user would like a route. Upon confirmation, the user can either select an available route option (if available) to select an option or proceed directly to a turn by turn navigation (if only the root is available). In FIG. 13C, the navigation process is illustrated where the map and textual instructions are displayed for navigating the user's way to the telephone bank. During navigation, a next action is displayed in a message area of the screen. All system messages and prompts are displayed in a similar fashion. The user can also elect to hide the messages.

Figure 14A:
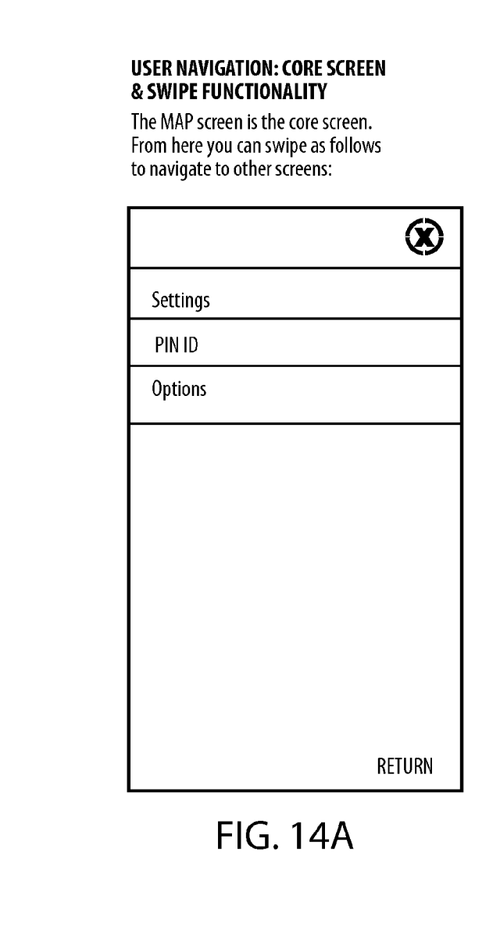
FIGS. 14A, 14B and 14C are screen shots showing user navigation core screen and swipe functionality.
Figure 14B:
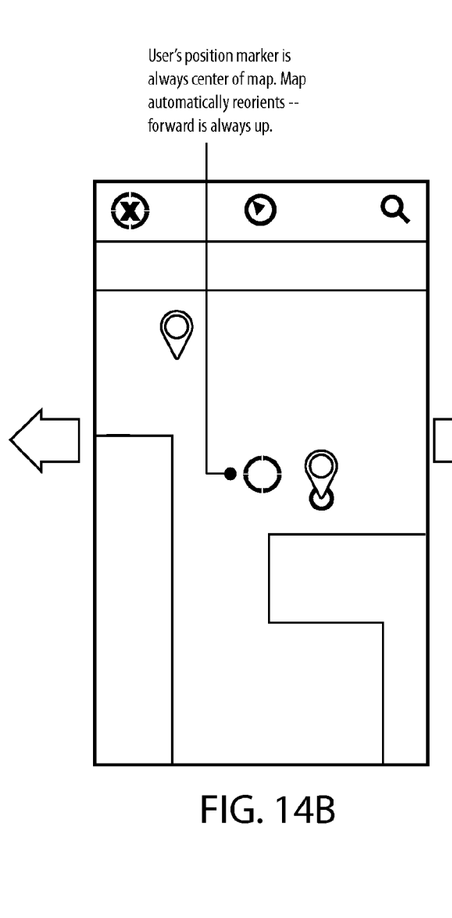
Figure 14C:
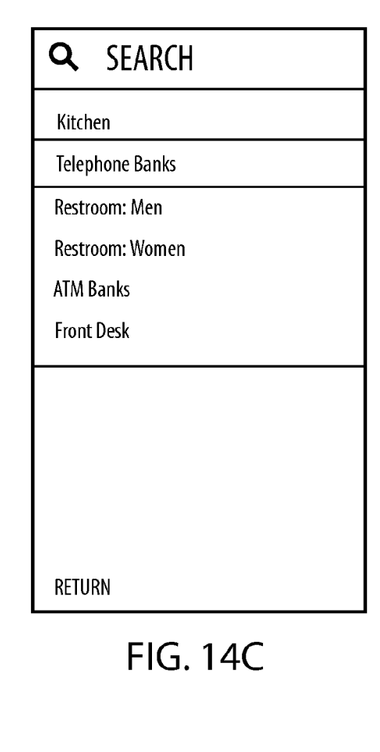

FIGS. 14A, 14B and 14C are screenshots showing user navigation course screen and swipe functionality. FIG. 14A illustrates the "map" screen which is the initial or "core" screen. As seen in the illustration, from the location of the arrow, the user can use a finger swipe to navigate to other screens. Either touching the "X" icon or swiping left to right will reveal the "settings" screen. As seen in FIG. 14B, the map screen is the default view using the app. The user's position marker is always at the center of the map. Thus, the map will automatically reorient itself so that the display is always up. FIG. 14C illustrates the selection screen for the type of destination point. In this case the bank is selected. Either touching the screen icon or swiping right to left reveals a "destination search" screen.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A system for providing turn-by-turn internal navigation comprising:
    at least one mobile device comprising:
        at least one receiver for receiving a plurality of radio frequency (RF) signal types;
        a display; and
        at least one microprocessor for executing the step of:
            receiving at least one of a Bluetooth low energy (BLE) signal, a Wifi signal or a cellular signal;
            determining a least two in-building geographic points based on receipt of the at least one of the BLE signal, Wifi signal or cellular signal;
            executing cyclical feedforward estimation position verification via redundant data collection for determining position calculation though available BLE, WiFi, or cellular signals readily available at a point in time;
            utilizing dead reckoning navigation in combination with results from the step of executing to generate positional information;
            providing building turn-by-turn navigation instructions to a selectable in-building location; and
            displaying the turn-by-turn navigation instructions on a map generated on the mobile device.

2. The system as in claim 1, wherein dead reckoning navigation utilizes at least one gyroscopic device integral to the mobile device.

3. The system as in claim 1, wherein feedforward estimation position determines distance to a predetermined target based on the equation:

$$Distance = \exp(1/10 * \log(10) * (RSSI+A)/(n*(C1+C2+C3)))$$

where:
        A is the radio signal strength indication (RSSI) for a given beacon at 1 meter;
        n is the signal's effectiveness value; and
        C1, C2, C3—are coefficients from adaptives based on geometric orientation and physical obstacles.

4. A method for providing turn-by-turn internal navigation for use with a mobile device comprising the steps of:
    receiving at least one of a first Bluetooth low energy (BLE) signal, a Wifi signal or a cellular signal;
    determining a least two in-building geographic points based on receipt of the at least one of the first BLE signal, Wifi signal or cellular signal;
    executing cyclical feedforward estimation position verification via redundant data collection for determining position calculation though available BLE, WiFi, or cellular signals readily available at a point in time;
    utilizing dead reckoning navigation in combination with results from the step of executing to generate positional information;
    providing building turn-by-turn navigation instructions to a selectable in-building location; and
    displaying the turn-by-turn navigation instructions on a map generated on the mobile device.

5. The method for providing turn-by-turn internal navigation as in claim 4, wherein the feedforward estimation uses trilateration navigation.

6. The method for providing turn-by-turn internal navigation as in claim 4, wherein dead reckoning navigation utilizes a compass within the mobile device.

7. The method for providing turn-by-turn internal navigation as in claim 4, wherein the feed forward estimation position is determined using the equation:

$$Distance = \exp(1/10 * \log(10) * (RSSI+A)/(n*(C1+C2+C3)))$$

where:
        A is the radio signal strength indication (RSSI) for a given beacon at 1 meter;
        n is the signal's effectiveness value; and
        C1, C2, C3—are coefficients from adaptives.

8. A method for determining turn-by-turn navigation information displayed on an mobile device comprising the steps of:
  receiving a cellular tower radio frequency (RF) signal, a WiFi signal, or a Bluetooth signal using the receiver on the mobile device; and
  executing trilateration navigation using feedforward estimation having at least one coefficient modifier and uses the equation:

$$Distance = exp(1/10 * log(10) * (RSSI+A)/(n*(C1+C2+C3)))$$

where:
  A is the RSSI for a given beacon @ 1 meter
  n is the signals effectiveness; and
  C1, C2, C3—are coefficients from adaptives.

9. The method for providing turn-by-turn internal navigation as in claim 8, wherein the WiFi signal and Bluetooth signal are broadcast from substantially open space in-building within a walled area.

* * * * *